US010097081B1

(12) United States Patent
Bucher, II et al.

(10) Patent No.: US 10,097,081 B1
(45) Date of Patent: Oct. 9, 2018

(54) CONVERTER HAVING LOW LOSS SNUBBER

(71) Applicant: ACBEL POLYTECH INC., New Taipei (TW)

(72) Inventors: James D. Bucher, II, New Taipei (TW); Alan D. Lauer, New Taipei (TW); Emma C. Trzynka, New Taipei (TW); Jason C. Dehn, New Taipei (TW)

(73) Assignee: ACBEL POLYTECH INC., New Taipei (TW)

( * ) Notice: Subject to any disclaimer, the term of this patent is extended or adjusted under 35 U.S.C. 154(b) by 0 days.

(21) Appl. No.: 15/880,250

(22) Filed: Jan. 25, 2018

(30) Foreign Application Priority Data

Dec. 1, 2017 (CN) .......................... 2017 1 1248757

(51) Int. Cl.
*H02M 1/34* (2007.01)
*H02M 3/335* (2006.01)
*H02M 1/44* (2007.01)

(52) U.S. Cl.
CPC ............... *H02M 1/34* (2013.01); *H02M 1/44* (2013.01); *H02M 3/33569* (2013.01); *H02M 2001/342* (2013.01)

(58) Field of Classification Search
CPC ...... H02M 1/34; H02M 1/44; H02M 3/33569; H02M 2001/342
See application file for complete search history.

(56) References Cited

U.S. PATENT DOCUMENTS

| 6,115,271 A * | 9/2000 | Mo ......................... H02M 1/34 363/21.12 |
| 6,314,002 B1 * | 11/2001 | Qian ....................... H02M 1/34 363/21.04 |
| 6,519,164 B1 * | 2/2003 | Weng ...................... H02M 1/34 363/17 |
| 2014/0362613 A1 * | 12/2014 | Park ....................... H02M 1/34 363/21.16 |

* cited by examiner

*Primary Examiner* — Emily P Pham
(74) *Attorney, Agent, or Firm* — Rabin & Berdo, P.C.

(57) ABSTRACT

The present application is a converter having a low loss snubber. The low loss snubber of the converter includes a clamping winding, a first capacitor, and a second capacitor. The clamping winding is magnetically coupled with a primary winding of a transformer of the converter. The primary winding to a secondary winding of the transformer leakage inductance energy is recovered by storing the energy in the second capacitor. When the second capacitor is discharging, the energy in the second capacitor may be further transferred to the first capacitor. When the first capacitor is discharging, energy in the first capacitor may be further returned to the power source. Therefore, the energy in the first capacitor and the energy in the second capacitor may not be consumed by a resistor, and power consumption of the low loss snubber may be decreased.

9 Claims, 14 Drawing Sheets

US 10,097,081 B1

CONVERTER HAVING LOW LOSS SNUBBER

CROSS-REFERENCE TO RELATED APPLICATIONS

This application claims the priority benefit of CN application serial No. 201711248757.2, filed on Dec. 1, 2017. The entirety of the above-mentioned patent application is hereby incorporated by reference herein and made a part of specification.

BACKGROUND OF THE INVENTION

1. Field of the Invention

The present invention relates to a converter, and particularly to a converter having a low loss snubber.

2. Description of the Related Art

With reference to FIG. 13, a conventional converter, such as a flyback converter, includes an input terminal I/P, a transformer with a primary winding Wp and a secondary winding Ws, a switch 21, a snubber 22, an output diode Dout, an output capacitor Cout, a first output terminal O/P1, and a second output terminal O/P2. The switch 21 and the primary winding Wp are electrically connected in series, and are electrically connected between the input terminal I/P and a ground. The snubber 22 includes a resistor R, a capacitor C, and a diode D. The resistor R and the capacitor C are electrically connected in parallel, and the resistor R and the capacitor C are electrically connected between a cathode of the diode D and the input terminal I/P. An anode of the diode D is electrically connected to a node connected by the primary winding Wp and the switch 21.

The secondary winding Ws is magnetically coupled with the primary winding Wp, and the secondary winding Ws is electrically connected between an anode of the output diode Dout and the second output terminal O/P2. The cathode of the output diode Dout is electrically connected to the first output terminal O/P1. The output capacitor Cout is electrically connected between the first output terminal O/P1 and the second output terminal O/P2.

The input terminal I/P is further electrically connected to a power source 23 to receive electric power from the power source 23. The first output terminal O/P1 and the second output terminal O/P2 are further electrically connected to a load 24 to transmit electric power to the load 24.

When the switch 21 is turned off, a primary current Ip flowing through the primary winding Wp and magnetic flux produced by the primary current Ip drop. A voltage induced in the secondary winging Ws is forward-biasing the output diode Dout, allowing an output current Iout to flow from the secondary winding Ws of the transformer. The energy from the transformer recharges the output capacitor Cout and supplies the load 24.

The transformer winding magnetizing current will try to maintain current flow when the switch 21 is open, causing the voltage on switch 21 to rise to $$V_{out} \times \frac{N_{Wp}}{N_{Ws}} + V_{in} \cdot V_{out}$$

is a voltage at the first output terminal O/P1, $N_{Wp}$ is a number of turns of the primary winding, $N_{Ws}$ is a number of turns of the secondary winding, and $V_{in}$ is a voltage at the input terminal I/P. Larger amplitude spikes occur due to parasitic leakage inductance between the primary winding Wp and the secondary winding Ws, where voltage is not coupled to the first output terminal O/P1. The voltage on the switch 21 will stay at $$V_{out} \times \frac{N_{Wp}}{N_{Ws}} + V_{in}$$

until on time volt-seconds equal off time volt-seconds.

Therefore, the snubber 22 may be provided to avoid the larger amplitude spikes. The snubber 22 may protect the converter from being damaged by the larger amplitude spikes. Besides, energy stored in the leakage inductance is transferred to the capacitor C, limiting the switch 21 voltage excursion above $$V_{out} \times \frac{N_{Wp}}{N_{Ws}} + V_{in}.$$

With reference to FIG. 14, when the switch is closed, the primary winding Wp of the transformer is directly connected to the power source 23. The primary current Ip and the magnetic flux in the transformer increases, and energy from the power source 23 may be stored in the primary winding Wp of the transformer. The voltage induced in the secondary winding Ws reverse-biases the output diode Dout. The load may be supplied with energy by the output capacitor Cout.

Further, the capacitor C may discharge to produce a discharging current Idis to flow through the capacitor C and the resistor R. Since the second discharging current Idis flows through the capacitor C and the resistor R, the resistor R may have power dissipation, and electric power may be wasted.

SUMMARY OF THE INVENTION

An objective of the present invention is to provide a converter having a low loss snubber. The converter having the low loss snubber may reduce power consumption.

To achieve the foregoing objective, the converter having the low loss snubber includes an input terminal, the low loss snubber, a transformer with a primary winding and a secondary winding, a switch, a first output terminal, and a second output terminal.

The switch and the primary winding are electrically connected in series, and are electrically connected between the input terminal and a ground.

The low loss snubber includes a clamping winding, a first capacitor, a second capacitor, a first diode, a second diode, a third diode, and a first inductor.

The first capacitor is electrically connected between an anode of the first diode and a first node connected by the primary winding and the switch. A cathode of the first diode is electrically connected to the input terminal.

A cathode of the third diode is electrically connected to the anode of the first diode. The first inductor is electrically connected between an anode of the third diode and a cathode of the second diode.

The second capacitor is electrically connected between the cathode of the second diode and the ground.

The clamping winding is magnetically coupled with the primary winding, and the clamping winding is electrically connected between the ground and an anode of the second diode.

The secondary winding is magnetically coupled with the primary winding and the clamping winding, and the secondary winding is electrically connected between the first output terminal and the second output terminal.

The input terminal is further electrically connected to a power source to receive electric power from the power source. The first output terminal and the second output terminal are further electrically connected to a load to transmit electric power to the load.

When the switch is turned on, the power source may provide a primary current flowing through a series circuit including the primary winding and the switch connected to the ground. Further, the second capacitor may charge the first capacitor through the first inductor and the third diode.

When the switch is turned off, the first capacitor may discharge. Further, the second diode and the second capacitor are used to transfer energy from a leakage inductance between the primary winding and the second winding to a capacitor, clamping a voltage spike. The clamping winding is employed to allow for a direct current (DC) offset compared to the primary winding. The first inductor discharges the capacitor, but allowing energy to be returned to the power source instead of being dissipated.

Therefore, at the moment that the switch is turned off, the first capacitor conducting through the first diode will slow the primary winding transition, reducing Electromagnetic interference (EMI). The first capacitor and the first diode do little to limit the voltage spike.

In conclusion, the energy used to charge the first capacitor was derived from the second capacitor that stored energy from the previous cycle inductive spike, returning the clamped energy to the power source. Therefore, the energy in the first capacitor and the energy in the second capacitor may not be consumed by a resistor, and power consumption of the low loss snubber may be decreased.

Other objectives, advantages and novel features of the invention will become more apparent from the following detailed description when taken in conjunction with the accompanying drawings.

DETAILED DESCRIPTION OF THE INVENTION

Figure 1:
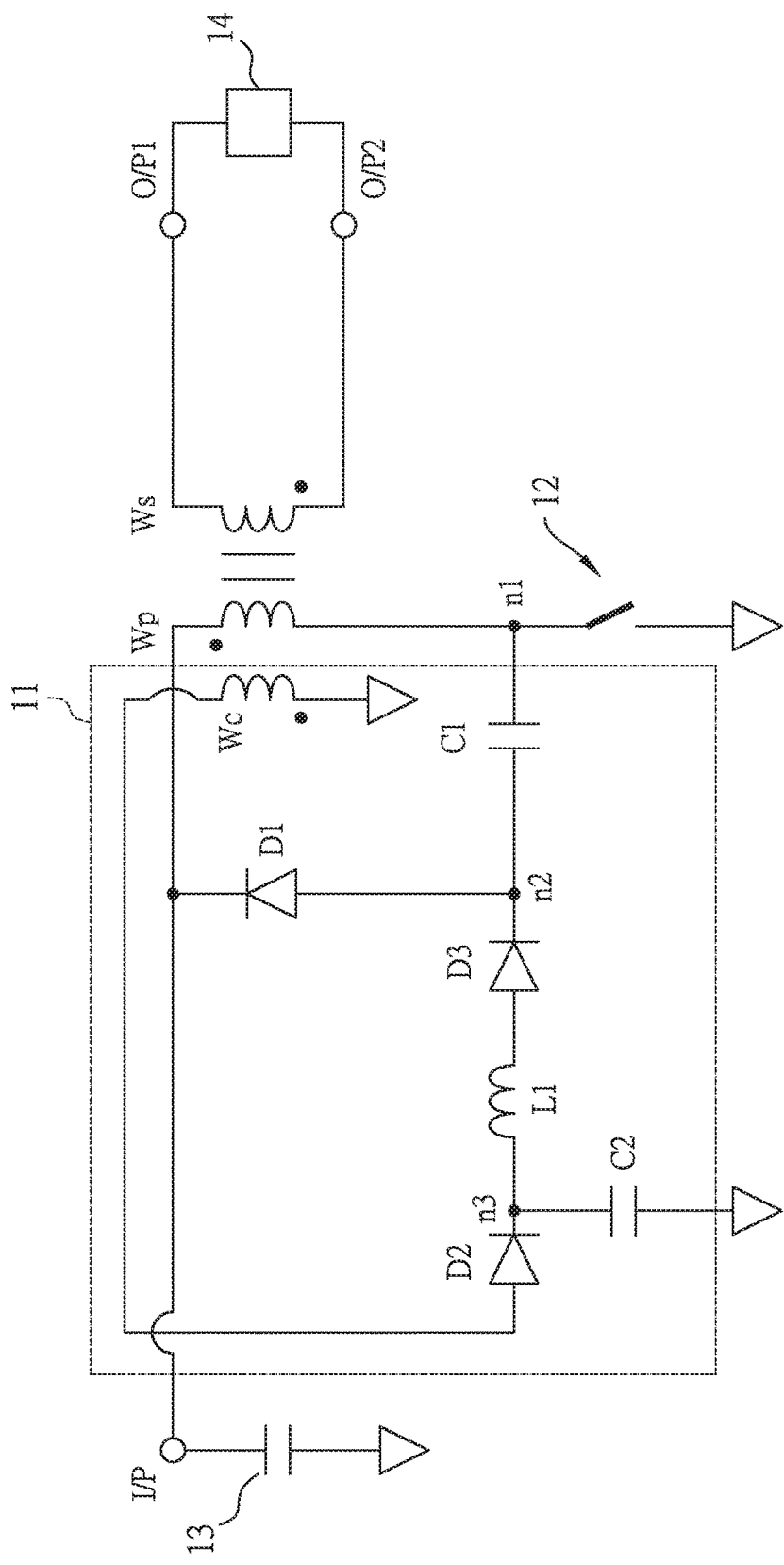
FIG. 1 is a circuit diagram of a first embodiment of a converter having a low loss snubber of the present invention.

With reference to FIG. 1, the present invention is a converter having a low loss snubber, and the converter includes an input terminal I/P, the low loss snubber 11, a transformer with a primary winding Wp and a secondary winding Ws, a switch 12, a first output terminal O/P1, and a second output terminal O/P2.

The switch 12 and the primary winding Wp are electrically connected in series, and are electrically connected between the input terminal I/P and a ground.

The low loss snubber 11 includes a clamping winding Wc, a first capacitor C1, a second capacitor C2, a first diode D1, a second diode D2, a third diode D3, and a first inductor L1.

The first capacitor C1 is electrically connected between an anode of the first diode D1 and a first node n1 connected by the primary winding Wp and the switch 12. A cathode of the first diode D1 is electrically connected to the input terminal I/P.

A cathode of the third diode D3 is electrically connected to the anode of the first diode DE The first inductor L1 is electrically connected between an anode of the third diode D3 and a cathode of the second diode D2.

The second capacitor C2 is electrically connected between the cathode of the second diode D2 and the ground.

The clamping winding Wc is magnetically coupled with the primary winding Wp, and the clamping winding Wc is electrically connected between the ground and an anode of the second diode D2.

The secondary winding Ws is magnetically coupled with the primary winding Wp and the clamping winding Wc, and the secondary winding Ws is electrically connected between the first output terminal O/P1 and the second output terminals O/P2. In a first embodiment of the present invention, a polarity of the clamping winding Wc is opposite to a polarity of the primary winding Wp.

The input terminal I/P is further electrically connected to a power source 13 to receive electric power from the power source 13. The first output terminal O/P1 and the second output terminal O/P2 are further electrically connected to a load 14 to transmit electric power to the load 14.

When the switch 12 is turned on, the power source 13 may provide a primary current flowing through a series circuit including the primary winding Wp and the switch 12 connected to the ground. Further, the second capacitor C2 may discharge to output a current Ic2 to charge the first capacitor C1 through the first inductor L1 and the third diode D3.

When the switch 12 is turned off, the first capacitor C1 may discharge. Further, the second diode D2 and the second capacitor C2 are used to transfer energy from a leakage inductance between the primary winding Wp and the second winding Ws to a capacitor, clamping a voltage spike. The clamping winding Wc is employed to allow for a direct current (DC) offset compared to the primary winding Wp. The first inductor L1 discharges the capacitor, but allowing energy to be returned to the power source 13 instead of being dissipated.

Therefore, at the moment that the switch 12 is turned off, the first capacitor C1 conducting through the first diode D1 will slow the primary winding Wp transition, reducing Electromagnetic interference (EMI). The first capacitor C1 and the first diode D1 do little to limit the voltage spike.

The primary winding Wp and clamping winding Wc are tightly coupled windings that allow the primary winding Wp clamp snubbing using a ground reference on the clamping winding Wc. The second diode D2 and the second capacitor C2 form a peak voltage clamp limiting the primary winding Wp voltage excursion.

In conclusion, the energy used to charge the first capacitor C1 was derived from the second capacitor C2 that stored energy from the previous cycle inductive spike, returning the clamped energy to the power source 13. Therefore, the energy in the first capacitor C1 and the energy in the second capacitor C2 may not be consumed by a resistor, and power consumption of the low loss snubber may be decreased.

Figure 2:
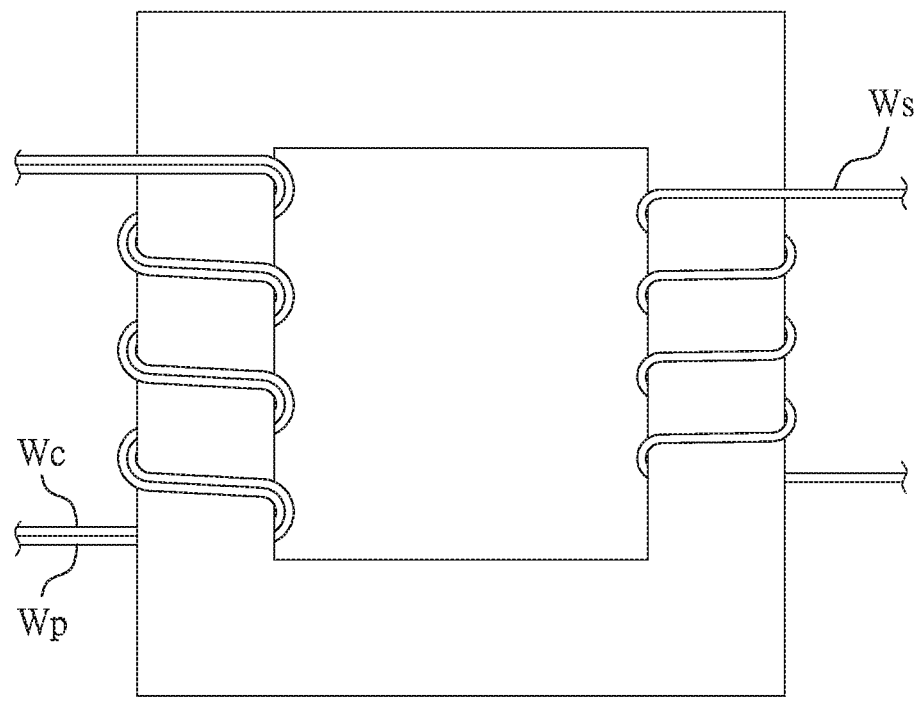
FIG. 2 is schematic view showing a clamping winding, a primary winding, and a secondary winding of FIG. 1.
Figure 3:
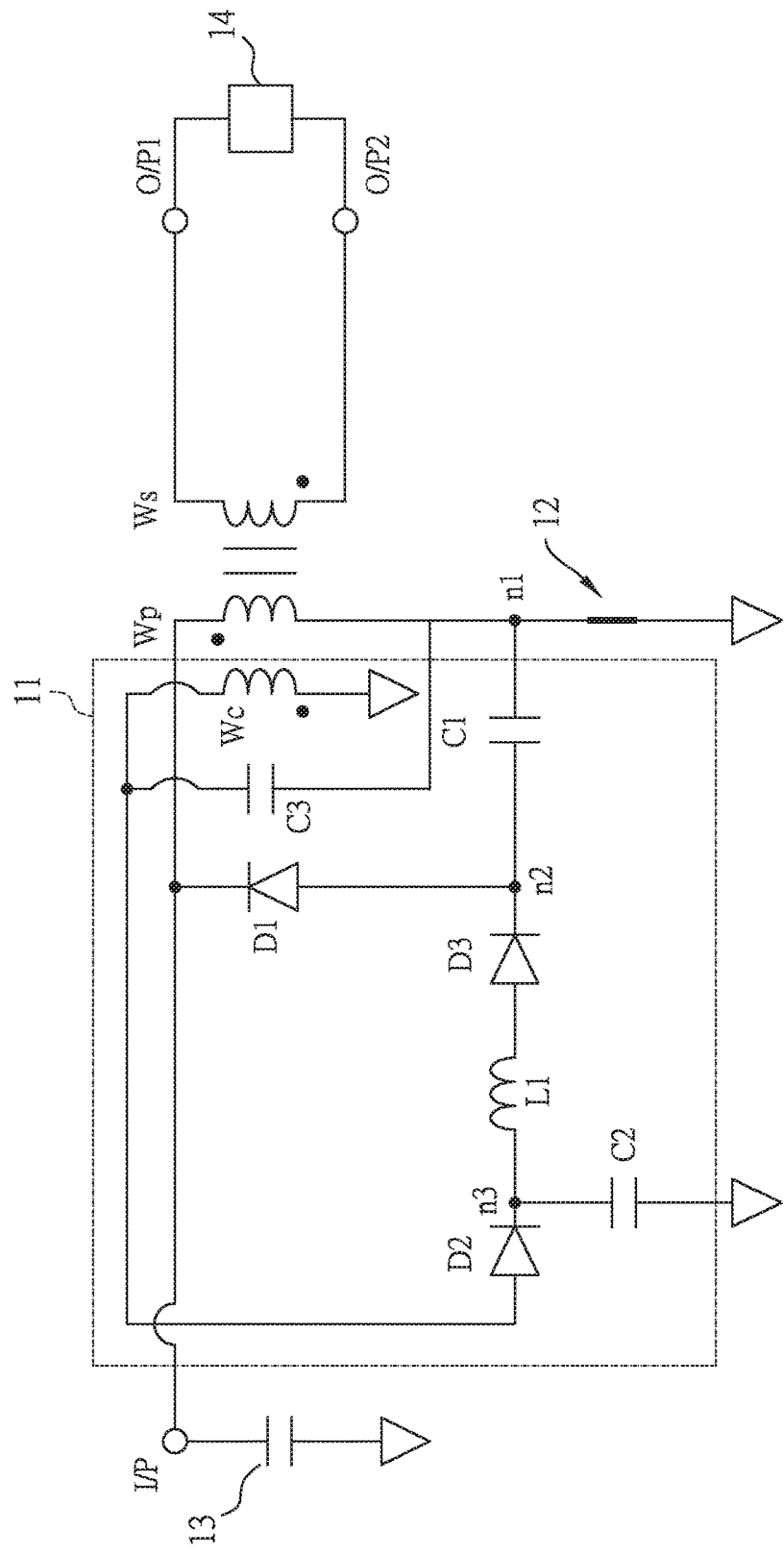
FIG. 3 is a circuit diagram of a second embodiment of a converter having a low loss snubber of the present invention.

Further with reference to FIGS. 1 and 2, the clamping winding Wc is wound with the same number of turns as the primary winding Wp, and is wound bifilar. Namely, the clamping winding Wc and the primary winding Wp have same number of turns. The clamping winding Wc and the primary winding Wp may form a bifilar structure to minimize leakage inductance and to provide magnetic coupling for voltage translation of voltage spike of the first node n1.

Besides, in a third embodiment of the present invention, the low loss snubber 11 further includes a third capacitor C3. The third capacitor C3 is electrically connected between the anode of the second diode D2 and the first node n1. Since the primary winding Wp to the clamping winding Wc leakage inductance is non-zero, the third capacitor C3 clamps the non-magnetically coupled energy stored in the leakage inductance.

Figure 4:
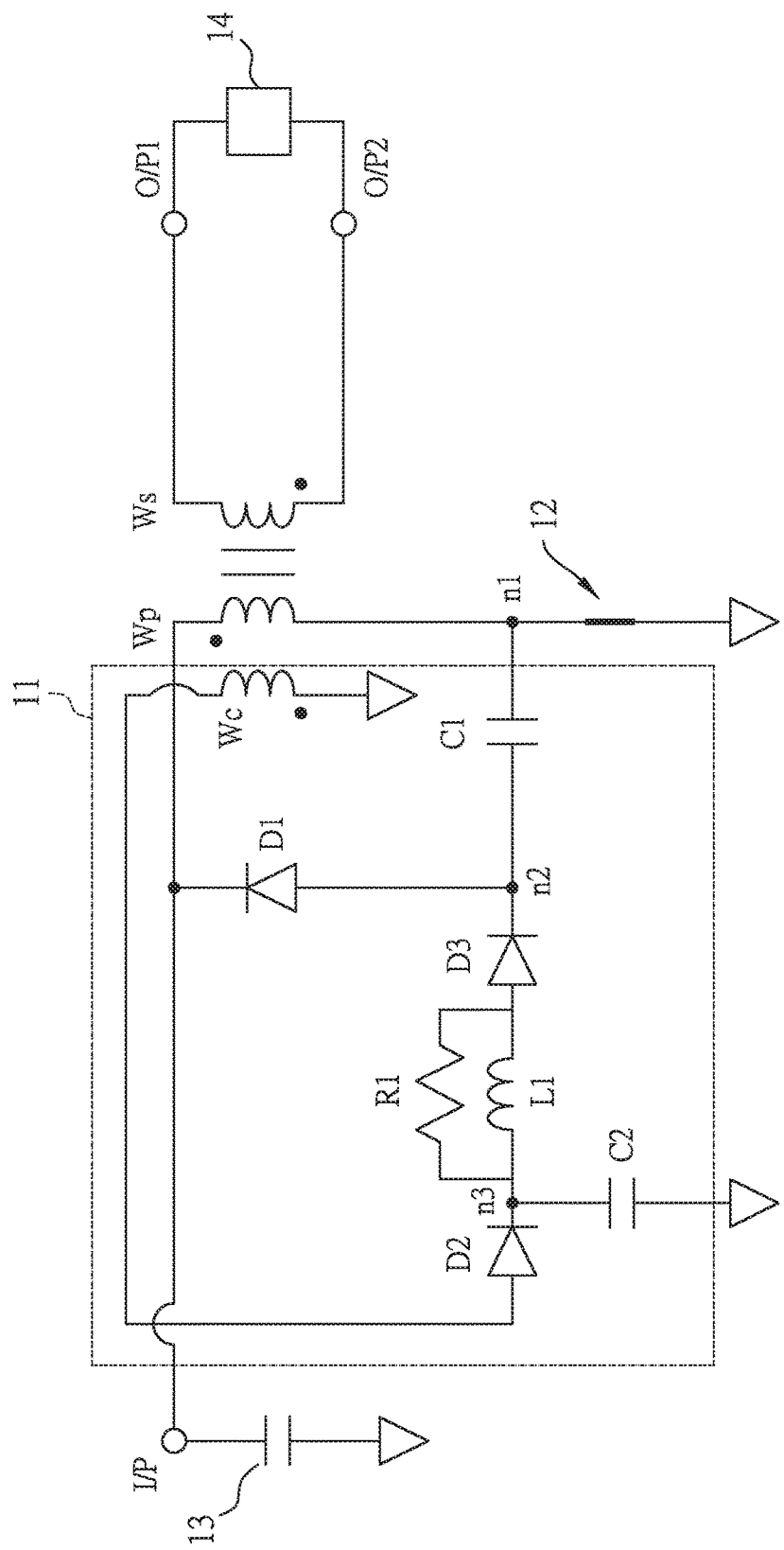
FIG. 4 is a circuit diagram of a third embodiment of a converter having a low loss snubber of the present invention.

With reference to FIG. 4, in a third embodiment of the present invention, the low loss snubber 11 further includes a first resistor R1, and the first resistor R1 is electrically connected in parallel with the first inductor L1. The parallel first resistor R1 may stabilize a circuit of the low loss snubber 11.

Figure 5:
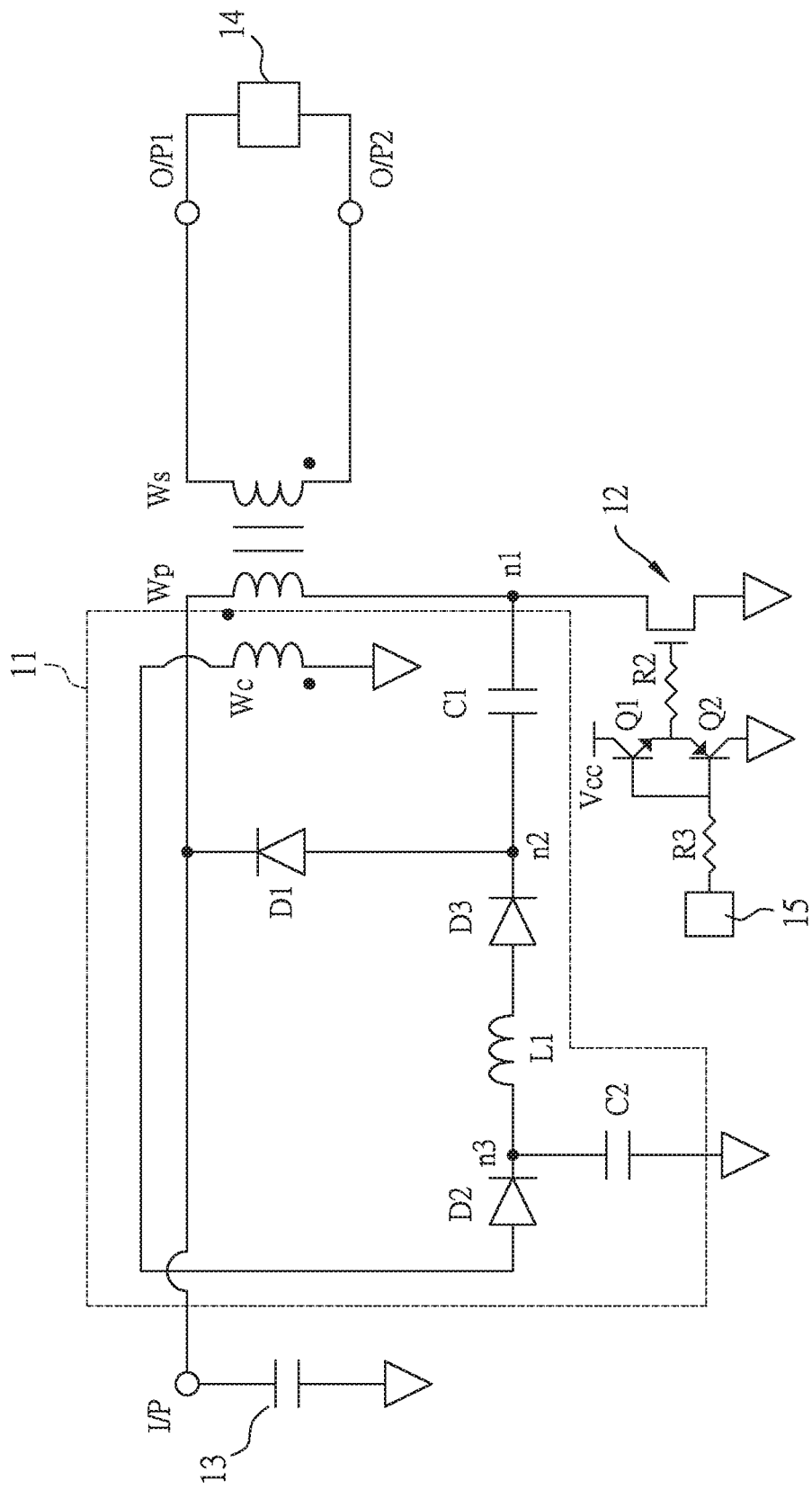
FIG. 5 is a circuit diagram of a fourth embodiment of a converter having a low loss snubber of the present invention.

With reference to FIG. 5, in a fourth embodiment of the present invention, the switch 12 is a Metal-Oxide-Semiconductor Field-Effect Transistor (MOSFET). A drain of the MOSFET 12 is the first node n1, and a source of the MOSFET 12 is electrically connected to the ground.

The low loss snubber 11 further includes a npn type bipolar junction transistor (BJT) Q1, a pnp type BJT Q2, a second resistor R2, a third resistor R3, and a driving circuit 15.

A collector of the npn type BJT Q1 is electrically connected to a collector power source Vcc. The collector power source Vcc is a power source to provide a collector voltage, such as 12V, to the collector of the npn type BJT Q1.

An emitter of the npn type BJT Q1 is electrically connected to an emitter of the pnp type BJT Q2, and a collector of the pnp type BJT Q2 is electrically connected to the ground. A base of the npn type BJT Q1 is electrically connected to a base of the pnp type BJT Q2. The second resistor R2 is electrically connected between the emitter of the pnp type BJT Q2 and a gate of the MOSFET 12.

The driving circuit 15 includes an output terminal to output driving signals. The third resistor is electrically connected between the output terminal of the driving circuit 15 and the base of the pnp type BJT Q2.

Power of the driving signals output by the driving circuit 15 may be amplified to be output to the gate of the MOSFET 12 to clearly control the MOSFET 12. In this embodiment, the driving signals may be Pulse Width Modulation (PWM) signals.

Figure 6:
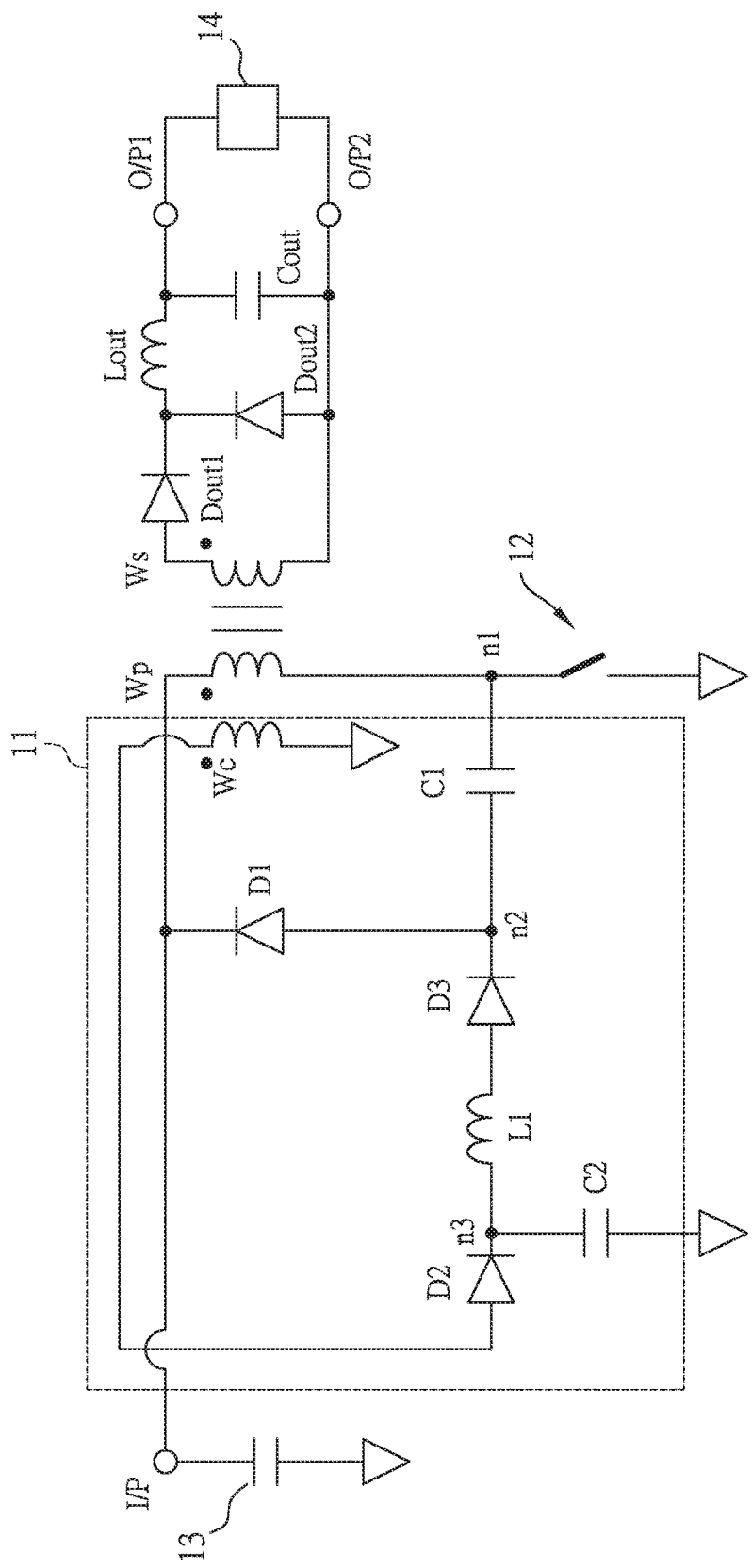
FIG. 6 is a circuit diagram of a fifth embodiment of a converter having a low loss snubber of the present invention.

With reference to FIG. 6, in a fifth embodiment of the present invention, the converter may be a forward converter, and the clamping winding Wc and the primary winding Wp are in phase.

The converter may further include a first output diode Dout1, a second output diode Dout2, an output capacitor Cout, and an output inductor Lout.

An anode of the first output diode Dout1 is electrically connected to one terminal of the secondary winding Ws. An anode of the second output diode Dout 2 is electrically connected to the other terminal of the secondary winding Ws, and a cathode of the second output diode Dout 2 is electrically connected to a cathode of the first output diode Dout1.

The output capacitor is electrically connected between the first output terminal O/P1 and the second output terminals O/P2. The output inductor Lout is electrically connected between the cathode of the first output diode Dout1 and the first output terminal O/P1. In this embodiment, a polarity of the secondary winding Ws is same as a polarity of the primary winding Wp.

In the fifth embodiment of the present invention, a ratio of a number of turns of the clamping winding Wc and a number of turns of the primary winding Wp is 1:3.

Figure 7:
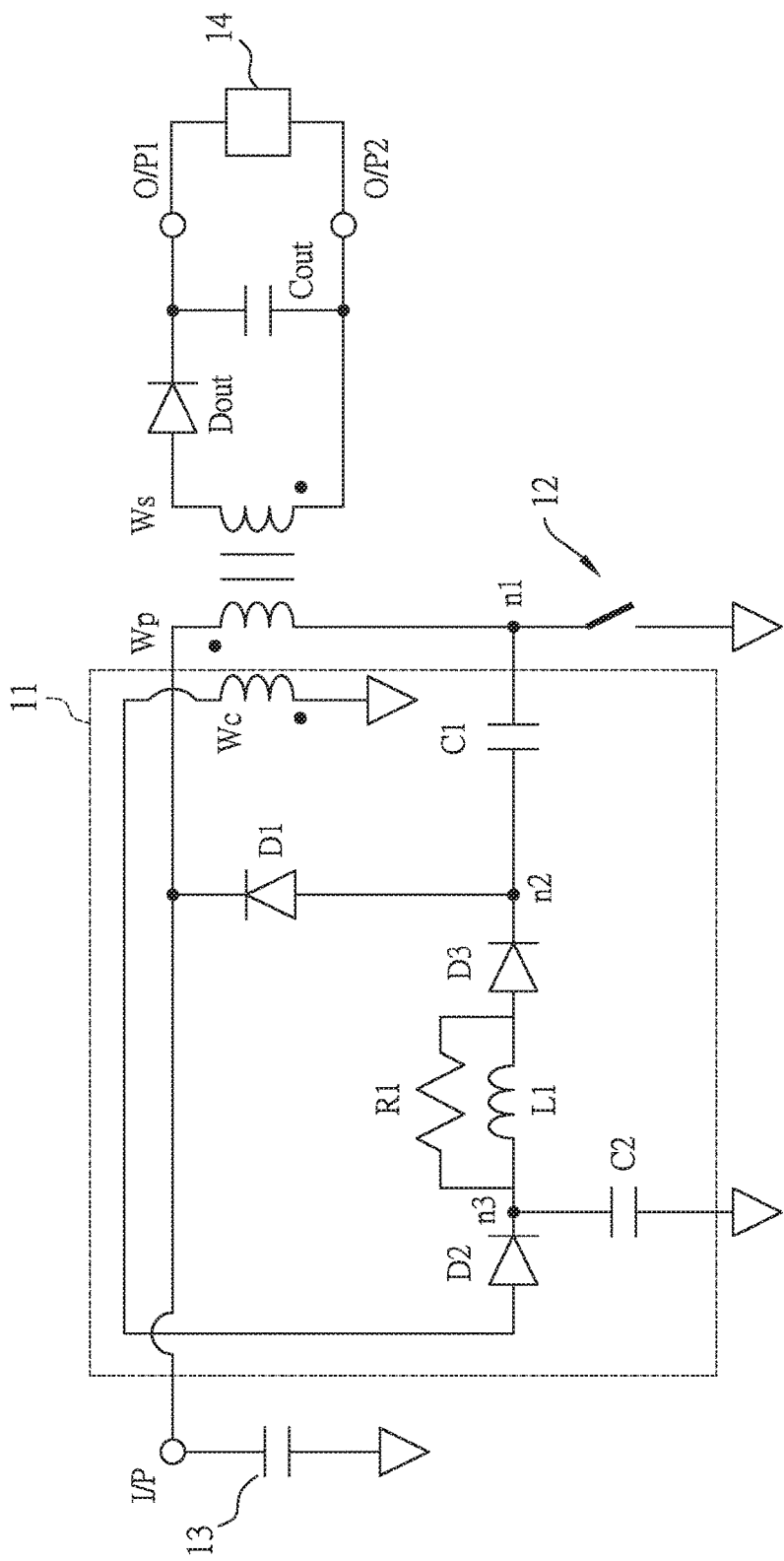
FIG. 7 is a circuit diagram of a sixth embodiment of a converter having a low loss snubber of the present invention.

With reference to FIG. 7, in a sixth embodiment of the present invention, the converter may be a flyback converter, and the converter may further include an output diode Dout and an output capacitor Cout.

The output diode Dout is electrically connected between the secondary winding Ws and the first output terminal O/P1. An anode of the output diode Dout is electrically connected to one terminal of the secondary winding Ws, and a cathode of the output diode Dout is electrically connected to the first output terminal O/P1.

The output capacitor Cout is electrically connected between the first output terminal O/P1 and the second output terminal O/P2. In this embodiment, a polarity of the secondary winding Ws is opposite to a polarity of the primary winding Wp.

Figure 8:
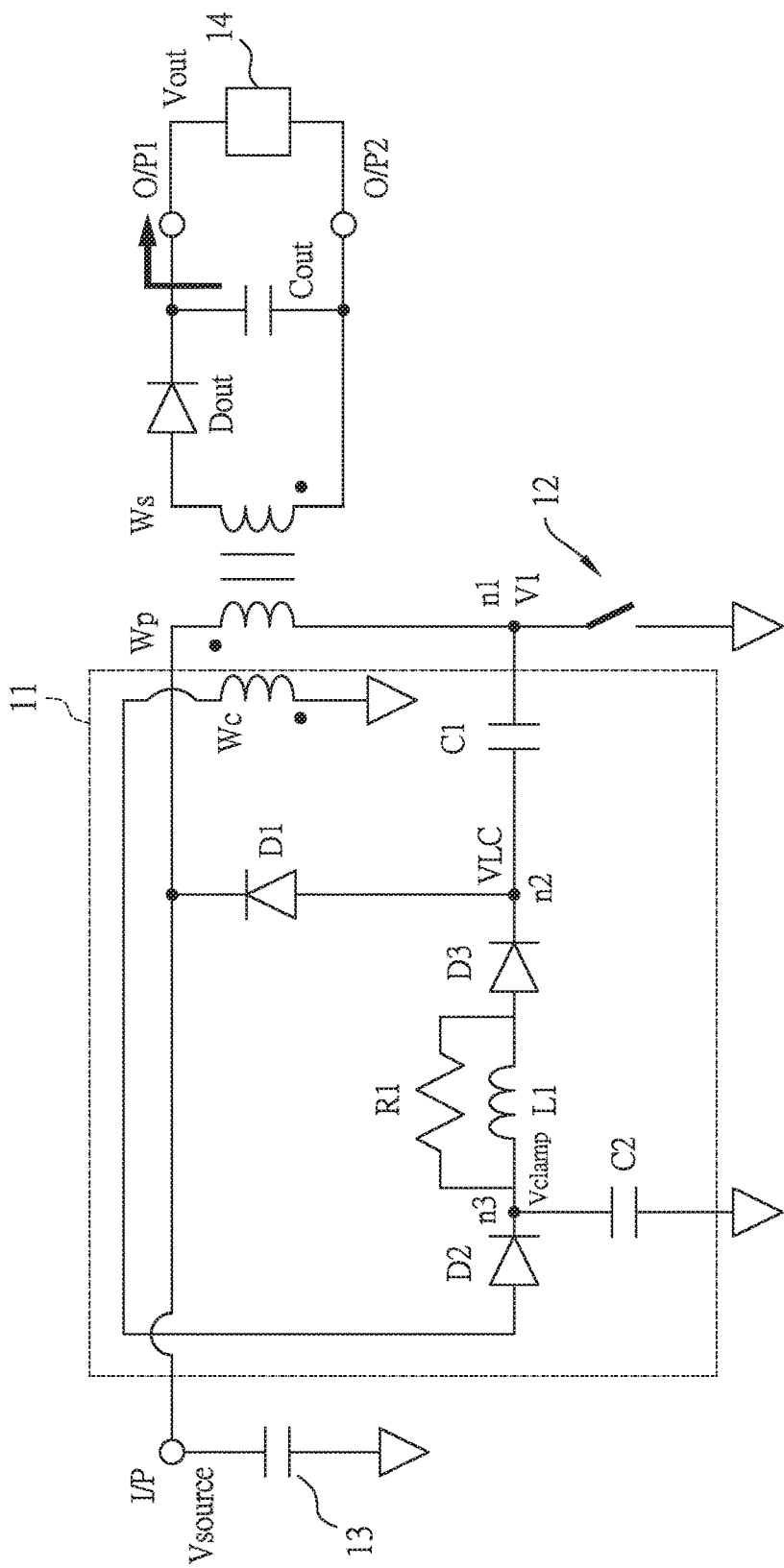
FIGS. 8-11 are circuit diagrams showing schematic currents flowing directions of the present invention.

For clearly explaining a circuit function of the converter of the present invention, a flyback converter is taken for an example. With reference to FIG. 8, a second node n2 is connected by the cathode of the third diode D3 and the first capacitor C1, and a third node n3 is connected by the cathode of the second diode D2 and the second capacitor C2. For example, a voltage of the power source 13 is Vsource, a voltage of the second node n2 is VLC, a voltage of the third node n3 is Vclamp, and a voltage of the first node n1 is V1.

When the switch 12 is turned off, the voltage of the third node n3 Vclamp is calculated by $$V_{clamp} = \frac{N_{Wp}}{N_{Ws}} \times V_{out} + \text{primary\_voltage\_spike}.$$

When the switch 12 turns on, the voltage of the second node n2 VLC may be close to 0, and the voltage of the second node n2 VLC may charge to the voltage of the power source 13 Vsource due to LC resonance. In this embodiment, $N_{Wp}$ is a number of turns of the primary winding Wp, and $N_{Ws}$ is a number of turns of the secondary winding Ws.

Further, the voltage of the first node n1 V1 is calculated by $$V_1 = V_{source} + \frac{N_{Wp}}{N_{Ws}} \times V_{out}.$$

A voltage across the first capacitor C1 Vc1 is calculated by $$V_{c1} = -\frac{N_{Wp}}{N_{Ws}} \times V_{out}.$$

Figure 9:
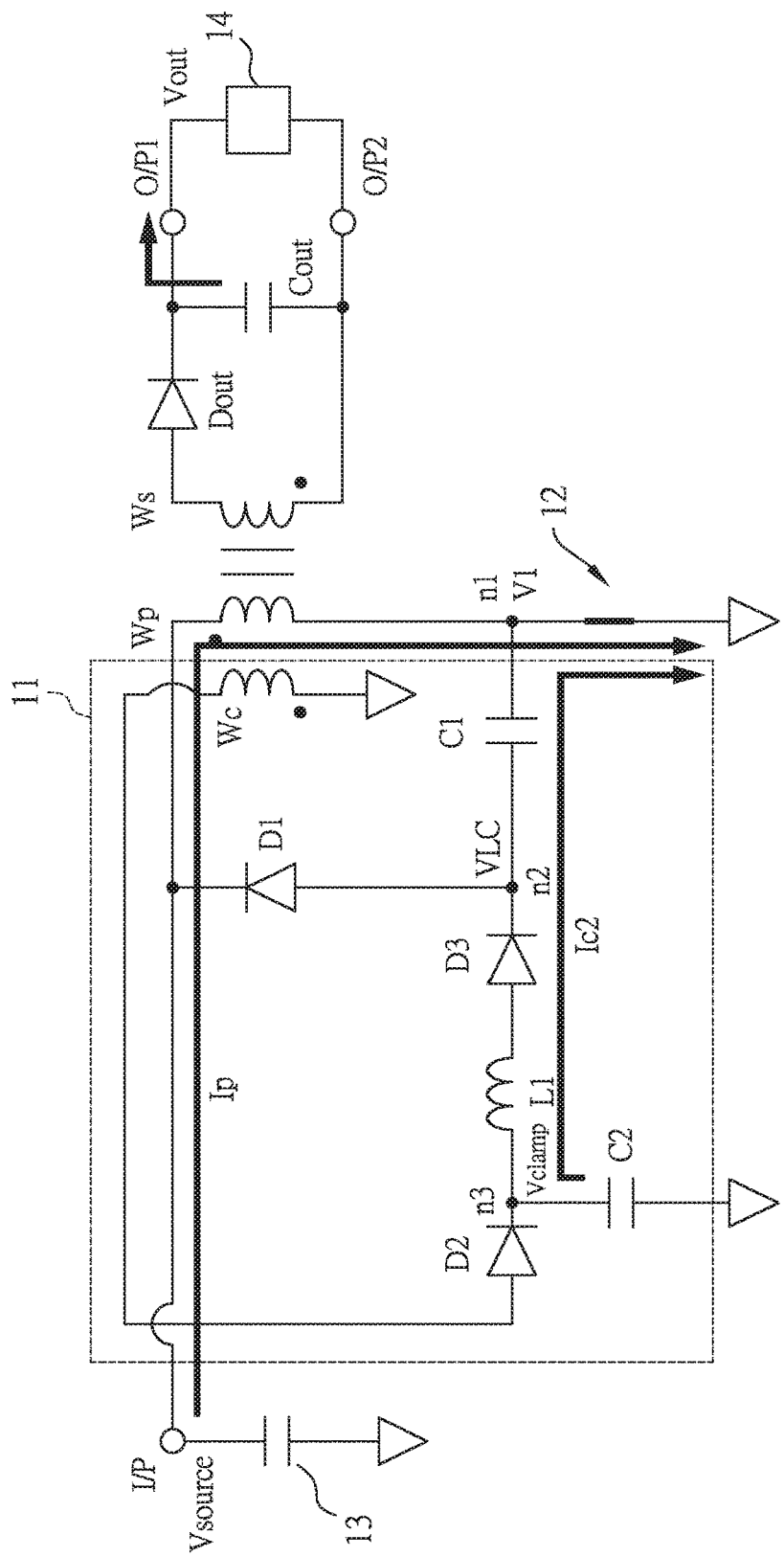

With reference to FIG. 9, when the switch 12 is turned on, the voltage of the first node n1 may be pulled down to the ground, such as 0V, and the power source may provide the primary current Ip flowing through the primary winding Wp and the switch 12 and to the ground.

Further, the voltage of the second node n2 may be −Vc1, and the voltage of the third node n3 may not be changed. When the flyback converter is operated under a critical conduction mode or a discontinuous conduction mode, the voltage across the first capacitor C1 Vc1 is calculated by $$V_{c1} = -\frac{N_{Wp}}{N_{Ws}} \times V_{out}.$$

When the flyback converter is operated under a continuous conduction mode, the voltage across the first capacitor C1 Vc1 is calculated by $$V_{c1} = -\left(V_{source} + \frac{N_{Wp}}{N_{Ws}} \times V_{out}\right).$$

When a voltage of the anode of the third diode D3 is greater than a voltage of the cathode of the third diode D3, the third diode D3 may be forward biasing. Therefore, the second capacitor C2 may discharge to output a current Ic2 to charge the first capacitor C1 through the third diode D3, and the first inductor L1 and the second capacitor C2 may resonate.

When the voltage of the anode of the third diode D3 is smaller than the voltage of the cathode of the third diode D3, the third diode D3 may be reverse biased. Therefore, the voltage of the second node n2 may not be less than the voltage of the third node n3. Namely, when the first capacitor C1 is discharging, the voltage of the second node n2 is maintained at Vsource. The voltage of the second node n2 does not discharge to the voltage of the third node n3.

Further, when the voltage of the anode of the first diode D1 is greater than the voltage of the cathode of the first diode D1, the first diode D1 may be forward biasing. Therefore, the voltage of the second node n2 may not be higher than the voltage provided by the power source 13, such as the voltage of the input terminal I/P. Namely, the first diode D1 keeps the voltage of the first node n1 at most up to the voltage of the input terminal I/P when the first capacitor C1 is charging.

In other words, the LC tank resonates up to Vsource. The third diode D3 keeps the first capacitor C1 from discharging down to Vclamp and the first diode D1 assures that maximum voltage at Vlc is not greater than Vsource.

Figure 10:
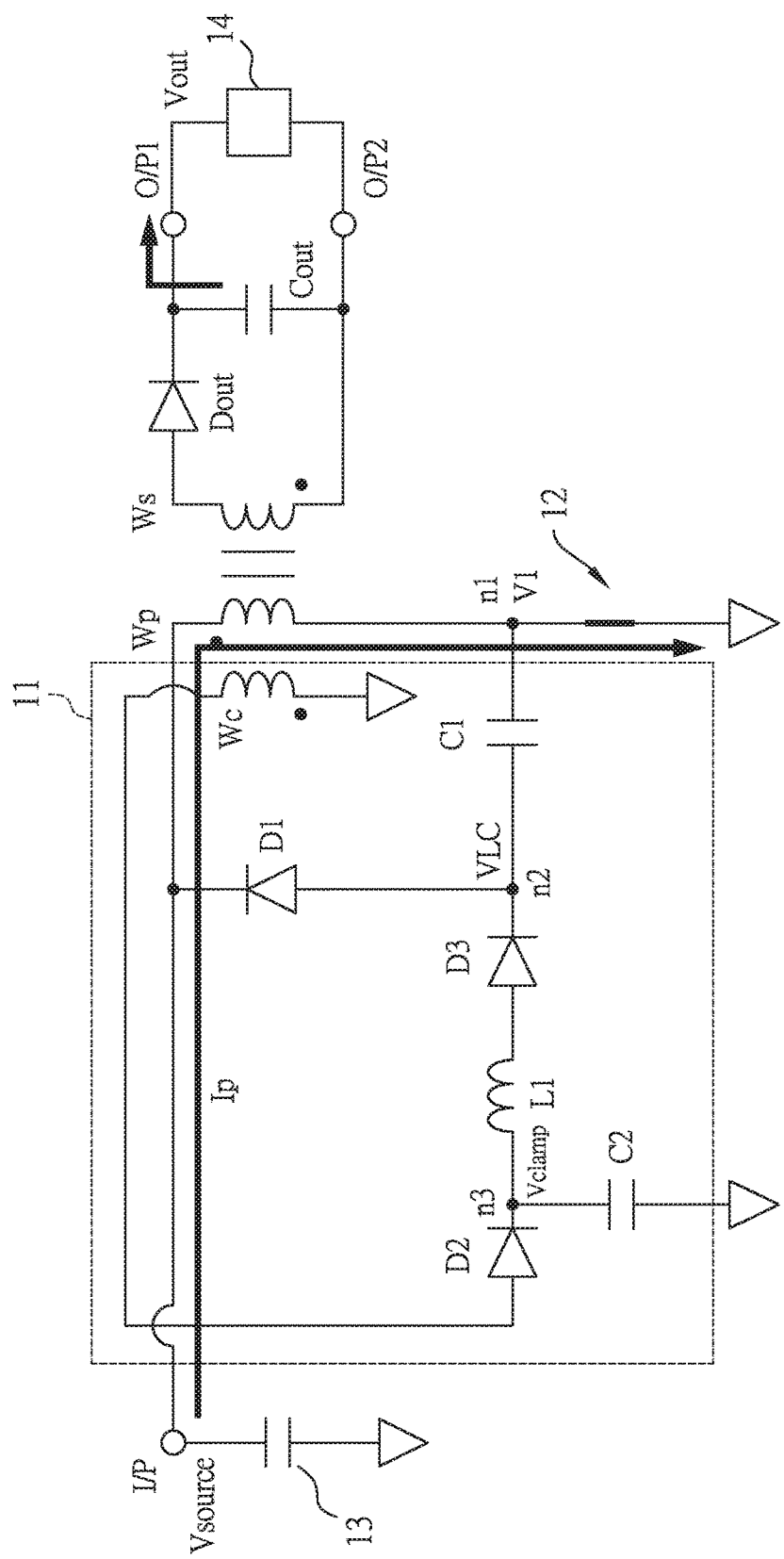

With reference to FIG. 10, when the switch 12 is turned on for a while, the second capacitor C2 may finish charging the first capacitor C1 through the third diode D3, and the voltage across the first capacitor C1 is approximately equal to Vsource.

Figure 11:
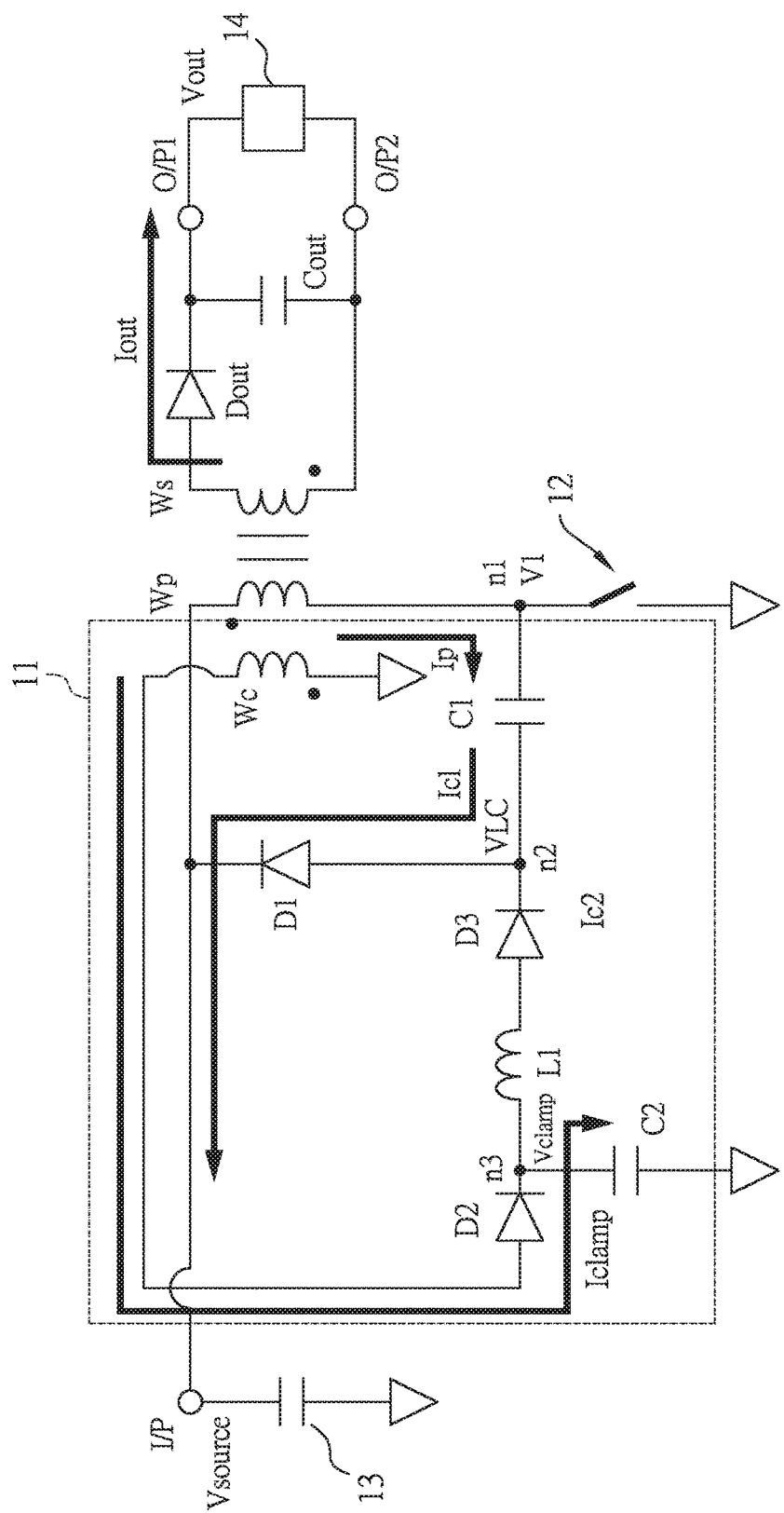

With reference to FIG. 11, when the switch 12 is turned off, the voltage of the first node n1 starts to rise. As the voltage of the first node n1 starts to rise, the energy stored in the first capacitor C1 is returned to the power source 13 through the first diode D1. Namely, the first capacitor C1 discharges to output a current Ic1 to return the energy stored in the first capacitor C1 to the power source 13. Further, the clamping current Iclamp may flow to the second capacitor C2 to avoid voltage spikes.

In other words, when the voltage of the first node n1 starts to rise, the energy stored in the first capacitor C1 is returned to the power source 13 through the first diode D1. The reduced rising of the voltage of the first node n1 allows a current flowing through the switch 12 to return to zero while the voltage of the first node n1 has little or no voltage applied, reducing switching losses and improving efficiency.

Besides, when the switch 12 is turned off, the primary current Ip flowing through the primary winding Wp and magnetic flux produced by the primary current Ip drop. A voltage induced in the secondary winging Ws is forward-biasing the output diode Dout, allowing an output current Iout to flow from the secondary winding Ws of the transformer. The energy from the transformer recharges the output capacitor Cout and supplies the load 14.

Further, since the clamping winding Wc is magnetically coupled with the primary winding Wp, the clamping winding Wc may create a voltage offset equal to $$V_{out} \times \frac{N_{Wp}}{N_{Ws}}$$

referenced to the ground to charge the second capacitor C2 through the second diode D2.

Figure 12:
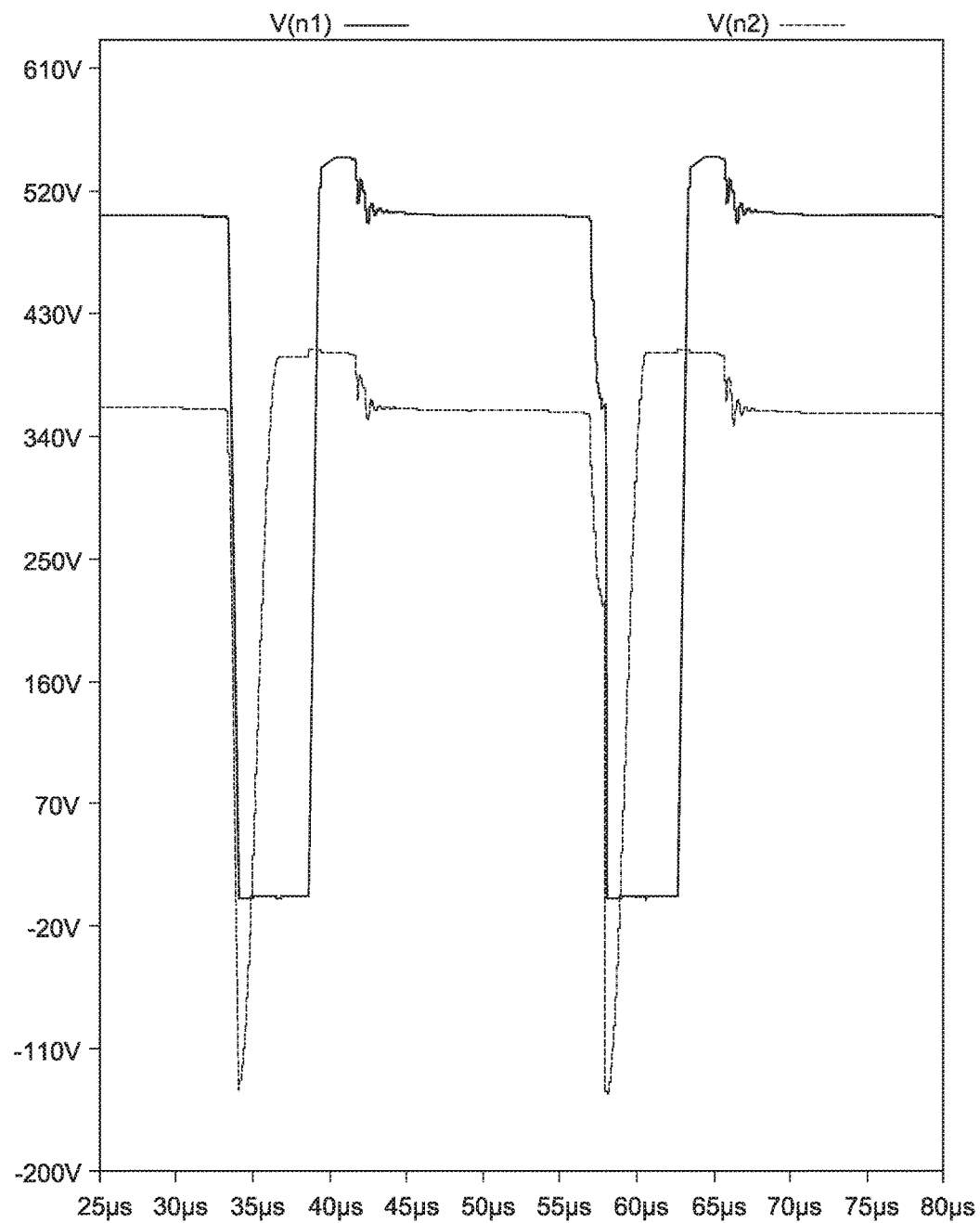
FIG. 12 is two waveforms of voltages of two terminals of a first capacitor of the low loss snubber of the present invention.
Figure 13:
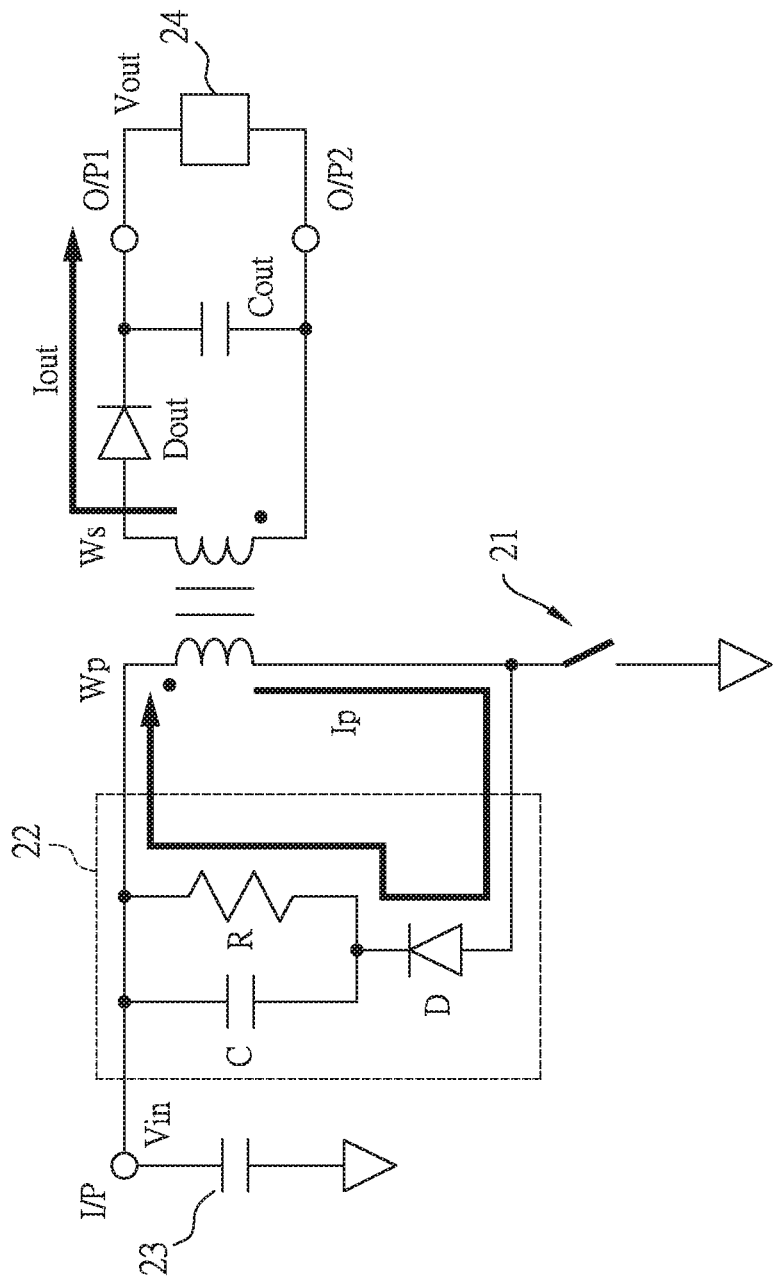
FIGS. 13 and 14 are circuit diagrams showing schematic currents flowing directions of a conventional flyback converter having a conventional snubber.
Figure 14:
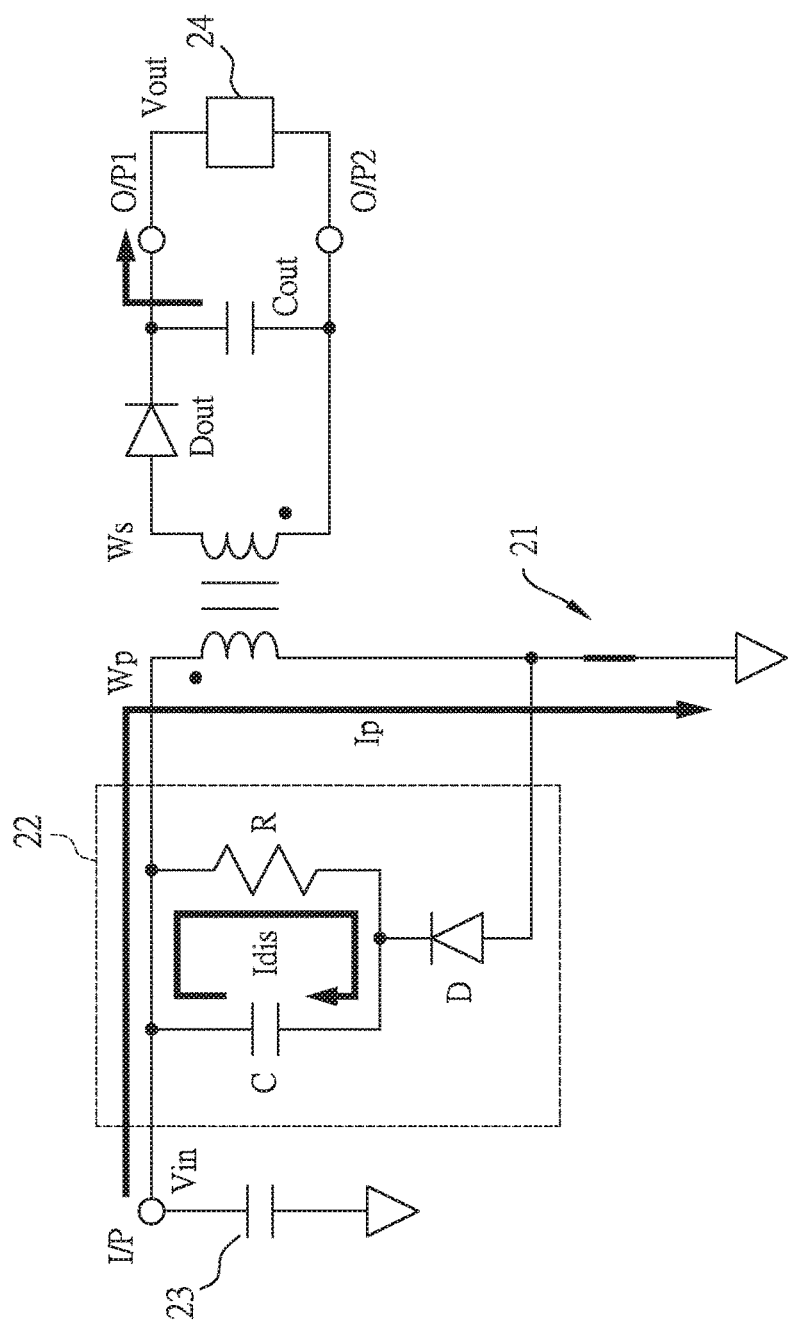

With reference to FIG. 12, the waveforms of the voltage of the first node n1 and the voltage of the second node n2 are shown. At the moment that the switch is turned off, the first diode D1 may be turned on, and the first capacitor may provide a current loop to maintain a current flowing through the primary winding Wp to avoid the voltage spike.

In conclusion, the primary winding Wp to secondary winding Ws leakage inductance energy is recovered by storing the energy in the second capacitor C2, similar to a RCD clamp snubber. The difference is that the clamping winding Wc is a voltage translation of the primary winding Wp referenced to the ground. The energy is recovered from the second capacitor C2 when the switch 12 turns on and the energy is transferred through resonant tank including the first inductor L1 charging the first capacitor C1 up to Vsource. When the switch 12 turns off, the first capacitor C1 slows down switching transition of the switch 12 for a reduction of EMI and switching losses, and returns leakage energy to the power source 13 through the first diode D1.

Further, the third capacitor C3 is a coupling capacitor between the primary winding Wp and the clamping winding Wc to recover energy from the primary winding Wp to clamp leakage inductance, and the voltage across the third capacitor C3 is typically equal to Vsource.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A converter having a low loss snubber, comprising:
an input terminal;

a transformer, comprising a primary winding and a secondary winding;
a switch; wherein the switch and the primary winding are electrically connected in series, and are electrically connected between the input terminal and a ground;
the low loss snubber, comprising:
 a first diode; wherein a cathode of the first diode is electrically connected to the input terminal;
 a first capacitor; wherein the first capacitor is electrically connected between an anode of the first diode and a first node connected by the primary winding and the switch;
 a second diode;
 a third diode; wherein a cathode of the third diode is electrically connected to the anode of the first diode;
 a second capacitor; wherein the second capacitor is electrically connected between a cathode of the second diode and the ground;
 a first inductor, electrically connected between an anode of the third diode and the cathode of the second diode;
 a clamping winding; wherein the clamping winding is magnetically coupled with the primary winding, and the clamping winding is electrically connected between the ground and an anode of the second diode;
a first output terminal;
a second output terminal; wherein the secondary winding is magnetically coupled with the primary winding and the clamping winding, and is electrically connected between the first output terminal and the second output terminal.

2. The converter having the low loss snubber as claimed in claim 1, wherein a polarity of the clamping winding is opposite to a polarity of the primary winding.

3. The converter having the low loss snubber as claimed in claim 1, wherein the clamping winding is wound with the same number of turns as the primary winding, and is wound bifilar.

4. The converter having the low loss snubber as claimed in claim 1, wherein the low loss snubber further comprises:
 a third capacitor, electrically connected between the anode of the second diode and the first node.

5. The converter having the low loss snubber as claimed in claim 1, wherein the low loss snubber further comprises:
 a first resistor, electrically connected in parallel with the first inductor.

6. The converter having the low loss snubber as claimed in claim 1, wherein the switch is a Metal-Oxide-Semiconductor Field-Effect Transistor (MOSFET);
 wherein a drain of the MOSFET is the first node, and a source of the MOSFET is electrically connected to the ground.

7. The converter having the low loss snubber as claimed in claim 6, further comprising:
 a npn type bipolar junction transistor (BJT); wherein a collector of the npn type BJT is electrically connected to a collector power source;
 a pnp type BJT; wherein an emitter of the npn type BJT is electrically connected to an emitter of the pnp type BJT; wherein a collector of the pnp type BJT is electrically connected to the ground; wherein a base of the npn type BJT is electrically connected to a base of the pnp type BJT;
 a second resistor, configured to be electrically connected between the emitter of the pnp type BJT and a gate of the MOSFET;
 a driving circuit, configured to comprise an output terminal to output driving signals;
 a third resistor, configured to be electrically connected between the output terminal of the driving circuit and the base of the pnp type BJT.

8. The converter having the low loss snubber as claimed in claim 1, further comprising:
 a first output diode; wherein an anode of the first output diode is electrically connected to one terminal of the secondary winding;
 a second output diode; wherein an anode of the second output diode is electrically connected to the other terminal of the secondary winding, and a cathode of the second output diode is electrically connected to a cathode of the first output diode;
 an output capacitor, configured to be electrically connected between the first output terminal and the second output terminal;
 an output inductor, configured to be electrically connected between the cathode of the first output diode and the first output terminal;
 wherein a polarity of the secondary winding is same as a polarity of the primary winding;
 wherein the clamping winding and the primary winding are in phase.

9. The converter having the low loss snubber as claimed in claim 1, further comprising:
 an output diode, configured to be electrically connected between the secondary winding and the first output terminal; wherein an anode of the output diode is electrically connected to one terminal of the secondary winding, and a cathode of the output diode is electrically connected to the first output terminal; and
 an output capacitor, configured to be electrically connected between the first output terminal and the second output terminal;
 wherein a polarity of the secondary winding is opposite to a polarity of the primary winding.

* * * * *